United States Patent Office 3,467,579
Patented Sept. 16, 1969

3,467,579
MICROBIOLOGICAL PROCESS FOR THE PRODUCTION OF LYCOPENE
Maria Luisa Bianchi, Giovanni Franceschi, Maria Pia Marnati, and Celestino Spalla, Milan, Italy, assignors to Società Farmaceutici Italia, Milan, Italy, a corporation of Italy
No Drawing. Filed Aug. 1, 1967, Ser. No. 657,541
Claims priority, application Italy, Aug. 4, 1966, 21,083/66
Int. Cl. C12c *13/00*
U.S. Cl. 195—28                               3 Claims

ABSTRACT OF THE DISCLOSURE

Described is a microbiological process for producing lycopene characterized in that the microorganism *Streptomyces chrestomyceticus* var. *rubescens* is cultivated in submerged culture or in surface and under aerobic conditions, in an aqueous nutritive medium containing a source of carbon, nitrogen and mineral salts, at the temperature of from 25° to 35° C., preferably at 28° C., over a period of from 4 to 8 days, and preferably 6 days.

---

The present invention relates to a new microbiological or biosynthetical process for the production of the known carotenoid lycopene.

Lcopene is found in a different species of ripe fruits, particularly in tomatoes. It was first isolated in 1873 by Hartsen from the fruits of *Tamus communis* in the form of red crystals. The name lycopene has been first used, however, in 1913 by Schunk who discovered the difference between lycopene and carotene. Lycopene, being a natural dye, is widely used in the foodstuffs industry and, in particular, in the production of margerine and butter (British Patent No. 838,925). More recently, the use of lycopene as feedstuff supplement for poultry has been taught to give a yellow color both to their meat and to the yolk of eggs (French Patent No. 1,333,942).

The already known different processes for the preparation of lycopene are based either on its extraction from some fruits containing it or on chemical processes or, finally, on fermentation. The extraction processes, owing to the scanty amount of lycopene contained in the natural products (20–50 mg. per kg.) are ot economical. The chemical processes, even if they give a production higher than the extraction processes, consist in complicated synthesis with numerous steps starting from rather expensive products and employing unstable, expensive and often dangerous reagents, so as to make the whole synthesis unsuitable on the industrial scale.

The fermentation processes are the most suitable for the production of lycopene on industrial scale and more convenient economically. Recently, E. J. Swarthout et al. (U.S. Patent No. 3,097,146 of July 9, 1963, claiming U.S. priority of June 30, 1961) has described a process consisting in the fermentation of two mated strains of opposite sex, belonging to the group of the mucorinee: particularly, strains of the species *Blakeslea trispora*, under aerobic conditions and in submerged culture or in the surface. Although this process represents a technical progress compared to previous processes, it represents two remarkable disadvantages. In the first place, the productivity of the system of mated strains is rather low (from 30 to 150 γ/ml.) and, in the second place, the fermentation technique is however, remarkably complicated because it requires the use of two strains contemporaneously making double the probability of having disadvantages such as infection degradation of the cultures, asynchronous growth of the two srtains etc., with consequent remarkable damage to the production.

Furthermore, if in such a process only one strain always of the species *Blakeslea trispora* is used instead of the two mated strains, the productivity is less than a quarter of the average values obtained with the two mated strains (Example 7 of the above-mentioned patent).

We have surprisingly found, and this is the object of the present invention, that by employing only one new strain of the Streptomyces genus, under the usual conditions of submerged culture in stirred flasks or in fermenters, lycopene is obtained with higher yields. The new microorganism employed in the process of the present invention has been obtained by a mutageneous treatment of *Streptomyces chrestomyceticus* var. *aurantioideus* described in British Patent No. 1,014,589 of Farmitalia. The resulting new strain has been designated with the name of *Streptomyces chrestomyceticus* var. *rubescens*. The *Streptomyces chrestomyceticus* var. *rubescens*, also called strain 2064 of the microbiological collection of Farmitalia, has been deposited at the Institute of Microbiology of Rutgers University (U.S.A.) receiving the Index No. 3910 and at the Commonwealth Mycological Institute (G.B.) receiving the Index No. IMI 126134. It has the following microscopic, macroscopic and biochemical characteristics.

MICROSCOPIC CHARACTERISTIC

On the usual culture media, the vegetative mycelium shows thin hyphae (0.5–1μ thick) of intermediate length and branched. The aerial hyphae are sparse and generally straight but sometimes bent into a hook form. The conidia are either cylindrical or oval and about 0.3 to 0.4 by 0.6 to 8μ.

MACROSCOPIC ASPECT

Table 1 lists the cultural properties observed on certain

TABLE 1

| Media | Growth | Aerial mycelium | Vegetative mycelium | Soluble pigments |
|---|---|---|---|---|
| Agar potato glucose [2] | Thin folded patina | Scanty, white-rose | Raspberry red | Absent. |
| Bennett agar [1] | Patina with abundant folds | Absent | Cherry-red | |
| Emerson agar [1] | Abundant lichen-like patina | do | Red | |
| Czapek agar [1] | Veil | do | Red-orange | |
| Asparagine-agar [1] | Abundant folded patina | Very scanty, dirty white | Yellow-orange | |
| Agar starch and Pridham salts [3] | Thin folded patina | Very scanty, white-rose | Red-brown | |
| Oats agar [2] | Granulated folded opaque patina | do | Dark-red | |
| Glycerine asparagine agar [1] | Folded patina | Very scanty, white-yellowish | Intense red | |

[1] Prepared according to Waksman "The Actinomycetes," vol. II, 1961, pages 328–333.
[2] Prepared according to Baldacci et al., "Journal of Microbiology" 1961, vol. 9, page 39.
[3] Prepared according to Pridham et al., "Antibiotics Annual" 1956–1957, pages 947–953.

media cited therein, on which the microorganism is grown at 28° C.; observations being made at the 3rd, 8th, 15th, 21st and 30th days after inoculation.

BIOCHEMICAL PROPERTIES

Gelatin: Hydrolyzed
Starch: Hydrolyzed
Nitrates: No reduction to nitrites
Production of hydrogen sulphide: Negative
Tyrosine: Degradation
Milk: Peptonized without coagulation
Utilization: Trehalose, d-levulose, d-sorbitol, d-mannose, galactose, lactose, adonitol, d-mannitol, maltose glycerol, dextrose, dextrin, starch No utilization: Ramnose, l-arabinose, d-xylose, saccharose Production: Lycopene in submerged liquid culture.

IDENTIFICATION OF THE STRAIN

The strain 2064 differs from *Streptomyces chrestomyceticus* (of British patent specification No. 880,035; Canevazzi and Scotti, Journal of Microbiology 1959, vol. 7, pages 242–250) in that it does not reduce nitrates, it peptonizes milk, it has a much scarcer aerial mycelium and an intensely red pigmented vegetative mycelium, and it produces lycopene. The strain 2064 differs from the previously mentioned *Streptomyces chrestomyceticus* var. *aurantioidene* of British Patent No. 1,014,589 in the color of the vegetative mycelium: yellow-orange in the former; and red in the latter. Both as to its origin and its properties, the strain 2064 is not very different from *Streptomyces chrestomyceticus*. We therefore think it should be considered a variety of *Streptomyces chrestomyceticus* and we have so designated it: *Streptomyces chrestomyceticus* var. *rubescens*.

*Streptomyces chrestomyceticus* var. *rubescens* may be stored by lyophilization using milk or milk serum as a suspending agent, or by collecting and keeping the spores in a sterile substrate. It can also be conserved by culturing on a solid medium containing glucose or other suitable sugar and nitrogenous substances (yeast extract, peptone, or casein hydrolyzate for example).

According to our invention, *Streptomyces chrestomyceticus* var. *rubescens* can be developed in a liquid culture medium, previously sterilized, under aerobic conditions, at from 25° to 35° C., preferably at 28° C., over a period of from 4 to 8 days (preferably 6 days) and at a pH which is, initially, 6.5–6.0 and at the end of the fermentative process is 6.0–5.5. The culture medium consists of a carbon source, a nitrogen source and a source of salts. The carbon source may consist of starch, dextrin, glucose, glycerin, mannitol, maltose, corn steep liquor, distiller's solubles, and/or soya-oil. The nitrogen source may consist, besides the complex substances containing nitrogen mentioned above, of dry yeast, meat peptone, and/or casein. Good results may also be achieved by using ammonium salts, such as ammonium nitrate, ammonium sulphate, and/or di-ammonium phosphate. The mineral salts vary according to the medium used and may, for example, be salts of potassium, magnesium, iron, zinc and/or copper. The fermentation may be carried out in Erlenmeyer flasks or in laboratory or industrial fermenters of various capacity.

The quantity of lycopene which is in the fermentation broths can be determined by spectrophotometric testing of small samples of the culture broth, generally 1–2 cc., and reading at 462 m$\mu$. All the lycopene produced is contained in the mycelium. The broth does not contain any. Therefore, to isolate the lycopene, the mycelium is separated for example by filtration, optionally using a silicious material, from the culture broth which is discarded. The filter cake, containing all the lycopene produced during the fermentation, is preferably extracted by pulping and shaking in a low boiling organic solvent such as diethyl ether, acetone, methylene dichloride, or chloroform. Mixtures of the above organic solvents may advantageously be used. The combined organic extracts are evaporated in vacuo and the residue taken up with petroleum ether and chromatographed through a column of silicic anhydride and eluted with a mixture of petroleum ether and acetone. The crude lycopene thus obtained can be purified by recrystallization from petroleum ether.

The following examples illustrate the invention.

Example 1

The strain 2064 was maintained by passages over a slant of a medium having the following composition:

| | G. |
|---|---|
| Yeast extract | 5 |
| Glucose | 10 |
| Magnesium sulphate (MgSO$_4$·7H$_2$O) | 0.5 |
| Sodium phosphate (Na$_2$HPO$_4$) | 1.4 |
| Potassium dihydrogen phosphate (KH$_2$PO$_4$) | 0.4 |
| Agar | 25 |

Distilled water to 1000 ml.
pH 7 before sterilization.
Sterilization, 120° C. for 20 minutes.

The medium was incubated at 28° C. for 6 days. The cultures thus obtained were used to inoculate some 300 ml. flasks each containing 60 ml. of the following vegetative medium:

| | G. |
|---|---|
| Dextrin | 30 |
| Casein | 5 |
| Calcium carbonate (CaCO$_3$) | 4 |
| Corn steep | 3 |
| Ammonium sulphate ((NH$_4$)$_2$SO$_4$) | 1 |
| Dipotassium hydrogen phosphate K$_2$HPO$_4$) | 0.1 |

Tap water to 1000 ml.
pH 6.4 before sterilization.
Sterilization, 120° C. for 20 minutes.

The medium was incubated at 28° C. for 26 hours on a rotary shaker with a range of 3.5 cm. at 230 r.p.m. The cultures thus obtained were inoculated into 300 ml. flasks each containing 30 ml. of productive medium having the following composition:

| | G. |
|---|---|
| Starch | 100 |
| Soya meal | 80 |
| Ammonium sulphate ((NH$_4$)$_2$SO$_4$) | 3 |
| Calcium carbonate (CaCO$_3$) | 3 |
| Potassium dihydrogen phosphate (KH$_2$PO$_4$) | 7.5 |
| Sodium chloride (NaCl) | 2.5 |
| Magnesium sulphate (MgSO$_4$·7H$_2$O) | 1 |
| Zinc sulphate (ZnSO$_4$·7H$_2$O) | 0.010 |
| Ferrous sulphate (FeSO$_4$·7H$_2$O) | 0.010 |
| Copper sulphate (CuSO$_4$·5H$_2$O) | 0.001 |

Tap water to 1000 ml.
pH 5.8 before sterilization.
Sterilization, 120° C. for 20 minutes.

The medium was incubated at 28° C. on a rotary shaker with a range of 3.5 cm. at 230 r.p.m. After 6–7 days, spectrophotometric analysis revealed the presence of 520 $\gamma$/ml. of lycopene in the broth. At this time, a silicious material filtration adjuvant was added to the fermentation mass and the mycelium mixed with this material was filtered from the liquid layer which was discarded since it did not contain lycopene. The filtration cake was shaken with acetone, optionally in mixture with methylene dichloride. The extracts combined were evaporated in vacuo to dryness. The residue was taken up with low boiling petroleum ether and the crude solution thus obtained was chromatographed over a column of silica gel and eluted with petroleum ether containing 2% of acetone. The eluates were evaporated to dryness in vacuo. The residue was recrystallized from petroleum ether to obtain pure lycopene melting at 170–172° C. The identity of this product was confirmed by comparison of its spectrum with the spectrum of a standard sample of lycopene, by chromatography, and by determination of the melting point of a mixture.

Example 2

Under the conditions of Example 1, a test was carried out to check the influence of the degree of aeration of the productive media on the production of lycopene. Various aeration levels were obtained by modifying the volume of productive medium in the flask. The results are reported in the following table from which it appears that the production of lycopene is proportional to the degree of aeration.

| Medium volume, ml. | Lycopene produced after 7 days, γ/ml. |
|---|---|
| 20 | 580 |
| 30 | 490 |
| 40 | 410 |
| 50 | 220 |
| 60 | 45 |

Example 3

Under the conditions of Example 1, a test had been carried out to check the effect of the age of the cultures on the vegetative medium. The results are reported in the following table.

| Age of the culture of the vegetative medium, hours | Lycopene produced after 7 days, γ/ml. |
|---|---|
| 22 | 350 |
| 26 | 530 |
| 30 | 518 |
| 36 | 480 |

Example 4

Fermentation was carried out as in Example 1, with the difference that instead of using the productive medium described therein, the following medium was employed:

| | G. |
|---|---|
| Distiller's solubles | 44 |
| Dry yeast | 5 |
| Corn steep | 3 |
| Dextrin | 80 |
| Magnesium sulphate ($MgSO_4 \cdot 7H_2O$) | 0.5 |
| Dipotassium hydrogen phosphate ($K_2HPO_4$) | 0.3 |
| Ferrous sulphate ($FeSO_4 \cdot 7H_2O$) | 0.010 |
| Zinc sulphate ($ZnSO_4 \cdot 7H_2O$) | 0.010 |
| Copper sulphate ($CuSO_4 \cdot 5H_2O$) | 0.001 |

Tap water to 1000 ml.
pH 6.5 before sterilization.
Sterilization, 120° C. for 20 minutes.

After 6 days of fermentation, the culture broth had a concentration of 410 γ/ml. in lycopene.

Example 5

In a 10 liter fermenter, 6 liters of the productive medium having the same composition as in Example 1 were sterilized by heating to 120° C. for 40 minutes. After cooling, the medium was inoculated with 600 ml. of a vegetative medium as in Example 1. Incubation was carried out at 28° C. with a degree of aeration corresponding to an air flow of 6 liters per minute and with a stirring corresponding to 380 rotations of a rotary shaker provided with 6 paddles. After 6 days of incubation a production of 450 γ/ml. of lycopene was obtained.

We claim:

1. A process for producing lycopene, which comprises cultivating the microorganism *Streptomyces chrestomyceticus* var. *rubescens* under aerobic conditions in an aqeuous nutritive medium containing a source of carbon, nitrogen and mineral salts at a temperature from 25° to 35° C. for from 4 to 8 days and thereafter recovering the lycopene.

2. The process of claim 1, wherein the cultivation is carried out at 28° C. for 6 days.

3. The process of claim 1, wherein the lycopene is isolated by filtration of the mycelium using a silicious material adjuvant, and the filter cake is extracted with a low boiling organic solvent.

References Cited

UNITED STATES PATENTS

| 3,330,737 | 7/1967 | Marnati et al. | 195—28 |
| 3,369,974 | 2/1968 | Ninet et al. | 195—28 |

ALVIN E. TANENHOLTZ, Primary Examiner

U.S. Cl. X.R.

195—80, 100